United States Patent Office 2,754,496
Patented July 10, 1956

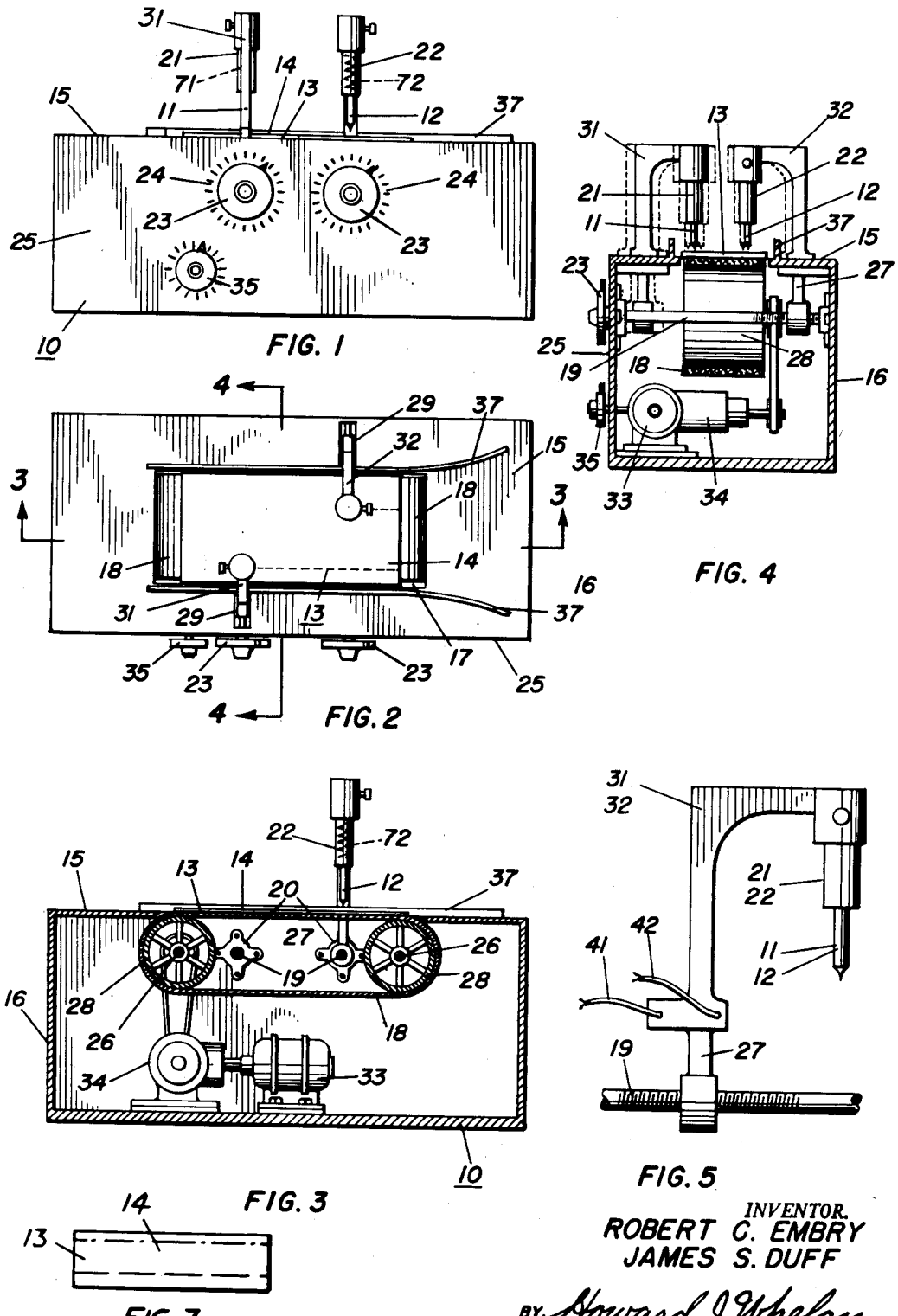
July 10, 1956     R. C. EMBRY ET AL     2,754,496
IDENTIFICATION CODER AND DECODER
Filed April 23, 1951     2 Sheets-Sheet 1
INVENTOR.
ROBERT C. EMBRY
JAMES S. DUFF
BY Howard J. Whelan.
ATTORNEY INVENTOR.
ROBERT C. EMBRY
JAMES S. DUFF
BY Howard J. Whelan.
ATTORNEY

2,754,496

IDENTIFICATION CODER AND DECODER

Robert C. Embry and James S. Duff, Baltimore, Md.

Application April 23, 1951, Serial No. 222,503

3 Claims. (Cl. 340—174)

This invention relates to marking and decoding equipment particularly to a device for invisibly marking cards or other identification media and scanning them electrically.

It is customary to permit the holder of a ticket or pass to enter restricted industrial or military areas that are open to him and to do so specifically without question, when he presents the paper, ticket or card properly signed for visual inspection. The official in charge of the entrance thereto visually looks over the pass while giving a casual glance at the possessor of it before passing the holder into the restricted area. It has been found that various methods have been fraudulently introduced, by unscrupulous parties, at times, to forge passes and gain such entrance improperly. This is especially true during war periods, where certain areas have data of a secret nature, and such parties want to obtain them surreptitiously. The conventional card may be forged but done so artistically as to present a very assuring and genuine appearance, thus enabling the user to pass unobstructed into the area that is not properly open to him. Various means have been tried out to overcome the difficulties of this form of espionage but they have the general objection of being slow and tedious and require expert investigation of a complicated nature when employed. For general purposes such means cannot be used practically. Therefore to avoid the objections and provide a quick and accurate method for determining the authenticity of a pass, ticket, passport, badge or the like, this invention comprises apparatus of an electrical or electronic nature that can be employed to physically mark, survey or scan the pass and determine its intrinsic value quickly. The pass is primarily processed to provide invisible markings with a predetermined code adopted for a particular area. It is arranged for secondary placement in a specially designed device to scan it electrically or electronically, so it renders such a code discernible in a manner that can be appreciated. Signals are indicated, on the proper alignment of the code on the card and that of a scanning component mounted on the device. They enable the operator to check up on the pass immediately and govern the action he will take in its regard.

The invention therefore has among its objects to provide a new and improved marking and checking device for passes and the like, that will avoid one or more of the disadvantages and limitations of the previous art.

Another object of the invention is to provide a new and improved electronically operated marking device for passes and the like, that may be varied in speed and frequencies to produce markings on the passes in various combination and to permit instant identification and determine their value or intrinsic genuineness.

A further object of the invention is to provide a new and improved checking device for electrically scanning a pass to determine its genuineness and propriety.

Still another object of the invention is to provide a new and improved electronic scanning device for disclosing expeditiously markings or code on a particular pass for the identification of its purpose.

An additional object of this invention is to provide a new and improved electronically scanning or coding device for use with passes and the like to mark and determine their genuineness and whether they are in the possession of the proper individual that they are assigned to.

An additional object of this invention is to provide a card with an invisible means of identification.

Other objects of the invention will be evident as it is more fully disclosed.

For a better understanding of the invention and the objects thereof, reference is made to the accompanying drawings. These drawings when used in conjunction with the following description outline a particular form of the invention by way of example. The claims included indicate the legal scope of the invention.

Referring to the drawings:

Figure 1 is a front elevation of a pass coder and decoder embodying this invention;

Figure 2 is a plan view of Figure 1;

Figure 3 is a sectional view taken along line 3—3 of Fig. 2;

Figure 4 is a sectional view taken along line 4—4 of Fig. 2;

Figure 5 is a side elevation of a pencil and holder and adjusting screw;

Figure 7 is a view of a card bearing two forms of code embodying this invention.

Similar reference parts throughout the drawings are designated by the same reference numerals.

Figure 6:
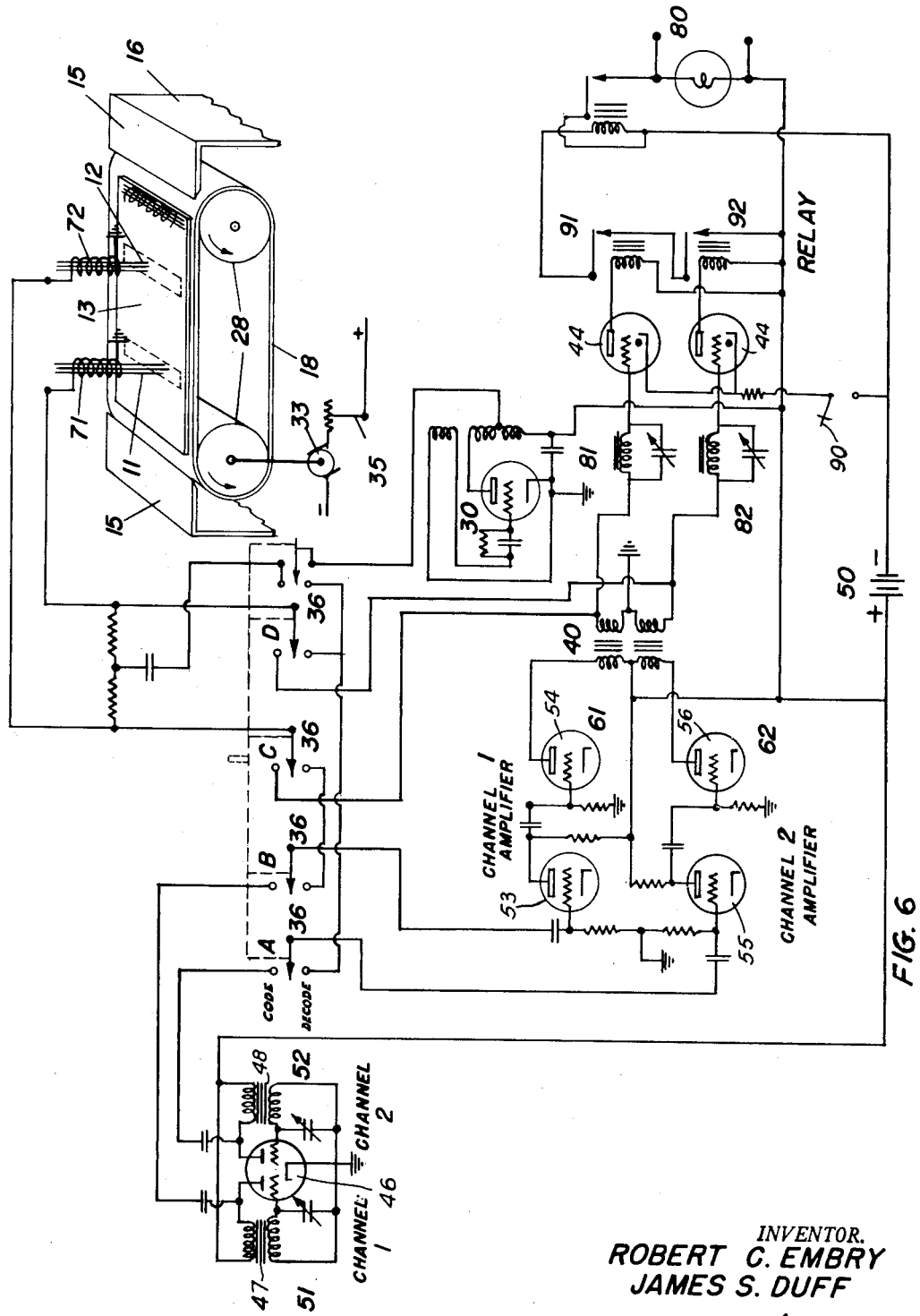
Figure 6 is a diagrammatic outline of the electrical circuits used in this embodiment.

The drawings show a device 10 intended for coding and decoding a pass card 13 preferably impregnated with powdered magnetic material such as used in recording tapes and the like. This material consists of finely divided iron oxide mixed with a suitable binder such as shellac and it is preferably made unnoticeable on at least one face 14 of the card. This face 14 has suitable wording printed on it to indicate the purpose of the card and the name or number of the one entitled to use it. Other wording to suit the particular circumstances connected with its use can be also provided as needed. However through the use of one or more magnetic recording-reproducing heads 11 and 12 pointed closely to the card and arranged for impressing a predetermined magnetic flux about a limited area through each point, a Paulsen effect of magnetic record is made and left in the magnetic composition of the card.

The magnetic recording-reproducing heads 11 and 12 are supported by adjustable holders 21 and 22 in holders 31 and 32 adapted for placement on table plate 15 of a cabinet 16. They are adjustable vertically and transversely across a rectangular window 17 left in the table 15 to give access to the card 13 carried on a flexible conveyor belt 18 running under it, in the cabinet. The transverse adjustment is made by screws 19 supported horizontally in the cabinet in bearings 20 and rotated by knobs 23 each provided with a dial 24 attached to the exterior surface of the vertical wall 25 of the cabinet. The magnetic recording-reproducing heads 11 and 12 are provided with magnetizing coils 71 and 72 indicated in dotted outline, so that a current passing through each from the lead wires 41 and 42 will energize them. The holders 21 and 22 have extending rectangular bars 27 projecting from them and running in slots 29 of rectangular cross-section provided in the table 15. Two magnetic recording-reproducing heads are preferably used in this embodiment so as to provide for two lines of coding and decoding on the card 13.

The belt 18 runs continuously over a pair of drums 28 and in a plane parallel to the top of the table 15. The shafts 26 of the drums 28 are journaled in the walls of the cabinet 16 and driven by a variable speed motor 33 resting on the bottom of the cabinet on its inner surface. The card 13 is placed on the continuous belt 18 and held by the adhesive friction provided by its surface.

Guide channels 37 are arranged on the table top at each side of the window, to guide the card straight across with the belt travel. The reference to the term "card" is intended to include passes, passports, tickets, badges, and other identifying items commonly used to allow a particular privileged person to travel about a designated area at a specified time or occasion. It is not limited to any material or size, other than that which convenience dictates, but for general purposes at the present time, plastic treated material is preferred.

In the use of the equipment referred to in this application two channels 1 and 2 respectively are arbitrarily selected for coding and decoding, and frequencies of 100 and 1000 cycles chosen for them. In the process of coding a card, the system is employed to magnetically affect the magnetic pigment in the card in a semi-permanent manner. By semi-permanent manner is meant the possibility of changing or demagnetizing the record or code made in the pigment by positive energy whenever it is found feasible to do so or leaving it as is. The demagnetizing is the same as used with present conventional wire and tape records. The process of decoding with this invention involves the use of the same device in reverse, arranged for picking up the magentic influences left by the original code in the card and carrying them to a signal that operates when it operably recognizes such.

Briefly the system can be indicated by the wiring diagram shown in Figure 6. In this figure the generators 51 and 52 of the channels 1 and 2, respectively send their respective frequencies through the amplifiers 61 and 62 to the magnetizing coils 71 and 72 respectively. The coils energize the magnetic recording-reproducing heads 11 and 12 and in turn magnetize and arrange the magnetic particles of the pigment in the area of the card they cover, according to the predetermined frequencies of 100 and 1000 cycles and the speed at which the card travels on the belt. If the card 13 is traveling in a straight line on the belt under the pencils, the code impressed will be theoretically arranged in a line with the frequencies represented therein in a magnetically physical degree. When the card is removed, the frequencies impressions are left incorporated in it. The ranges of frequencies of the generators are made variable to suit the wishes of the coder. In this instance it is assumed that the card is to be used by an individual authorized to visit a certain industrial area and that the frequencies 100 and 1000 together with their spacing on the card will enable him to do so. It should be noted that the time rate of travel used in coding the card may be varied by changing the speed of the motor 33 running the belt 18 under the stationary points of the magnetic recording-reproducing heads 11 and 12. Thus each resulting code line impressed magnetically will have the characteristics of the frequency and spacing of the wave outlines selected. The position of the magnetic recording-reproducing heads can also be varied transversely across the table 15 and incidently over the card placed on the belt.

In the decoding process the generators are disconnected, and the magnetic recording-reproducing heads 11 and 12 pick up the magnetized code lines on the card and pick up the minute currents impressed by them on the magnetic recording-reproducing heads and coils. The currents pass into the decoding circuits and activate them into action by the energy collected. The circuits carry the currents to the amplifiers 61 and 62 where they continue to the filter units 81 and 82. The filter units pass the currents selectively if the frequencies are of the proper type, otherwise they are turned out and nothing passes through. The signal developed at the output of the selective filters 81 and 82 are impressed on the respective grids of the two thyratrons and cause them to fire, increasing the plate current causing relays 91 and 92 to pull down thus lighting lamp 80, if the proper frequencies are being passed simultaneously by the filters. The reset switch 90 is of the normally closed type and is used to momentarily interrupt the current flowing through the thyratrons, thus restoring them to their non-conducting state. If the frequencies do not pass thru filters 81 and 82, set for designated frequencies, the signal lamp 80 will not light and the operator knows that the card is not passable, or ineligible. In the use of the system, the coding and decoding systems are made interchangeable by using a five-pole double-throw gang switch 36, which couples their circuits to do this in a conventional manner, as indicated in Figure 6.

In a more explanatory outline shown in Fig. 6, a wiring diagram of the circuits, that can be used for the purposes of this invention, employs two channels 1 and 2. The generator 51 provides the frequency coding current for channel 1 and the generator 52 for the channel 2. The generator and other parts of the system are indicated grounded and it will be assumed that such is followed in all parts of the circuits wherever feasible. The symbols used are those commonly adopted for conventional representations of the electronic components included in the circuits and do not require further explanation to those skilled in the art. There are five double-throw switches A, B, C, D and E operably ganged together at 36. The upper contacts in the diagram connect the generators 51 and 52, amplifiers 61 and 62 respectively to the magnetic recording-reproducing heads 11 and 12 for coding the card 13. When the switches are closed on the bottom contacts the device operates as a decoder and transmits the impulses from the magnetic recording-reproducing heads 11 and 12 through the amplifier units 61 and 62 to operate the relays 91 and 92 that serve to connect up the lamp signal 80 so it will become illuminated. The oscillator 30, supplies a continuous high frequency current of approximately 50 kc. to the recording heads. This high frequency signal is commonly called the "bias frequency." The lower audio frequencies that are to be recorded or coded on the cards are superimposed over the 50 kc. bias frequency. The transformers 40 are intercoupled as shown in a conventional manner, with a source of energy 50 provided for the power requirements.

Tubes 53 and 54 are amplifiers in the channel 1 circuit and tubes 55 and 56 are amplifiers in the channel 2 circuit. While a decoder could be used in this system, none is used because the thyratron tubes 44 would be biased past cut-off and would only conduct when the peak A. C. voltage passing through the filter units 81 and 82 exceed the bias voltage; in other words, they set their own cut-off and when thyratron tubes 44 are not conducting nothing happens and, therefore, the relay circuits do not operate. When the proper frequency is applied to the grids of tube 44 through the filter, then they start to draw current and pull the relay down to energize the circuit and give an indication that the proper frequencies are present.

The motor 33 is connected with the drums 28 by a transmission 34 and through a control 35 is arranged to be operated at any selected speed.

Before an individual is given a card, the latter is processed through the coding circuits of the scanner magnetic recording-reproducing heads 11 and 12 by placing the card on the belt 18 and running it through the device until it is magnetically coded in two lines (in this instance) running longitudinally over the card. When this is done, it is removed and given to the individual for his identification.

The individual presents the card at the proper place for identification. The local operator takes it and passes it through the scanner with the switches in the decoding position, and if the signal operates, he validates the card and allows the user to pass.

The card can be coded in a considerable number of ways, due to the possibility of establishing a great number of positions transversely across the table for the magnetic recording-reproducing heads 11 and 12. Firstly, by adjusting the screws 19 and brackets 31 and 32, individually or together. Secondly by varying the frequencies of the generators or oscillators 51 and 52, either individually or together. Thirdly by varying the speed or operation of the motor 33 and incidently the rate of travel of the card across the table. Of course, the number of magnetic recording-reproducing heads can be changed to bring about further changes in the code lines in the card. The card is given particular code impression as required, and that impression is established for a particular use of the card. The owner of the card is therefore certified for that particular use.

Since the impressions of the code on the card are invisible and subject to considerable variations they cannot be easily copied or forged by an unauthorized person. Those who would try to copy or forge such a card would have considerable obstacles placed in their paths that would take much time and trouble to overcome. Since the code is changeable very easily, and its transposition to the card easily accomplished by the authorized, while at the same time providing for the removal of the older codes, it is very easy to change the card quickly and often to offset any such unauthorized copying.

The decoding is simple and even an unskilled person could operate it to determine whether authorized cards are being used, or not. The equipment necessary for the production of a device of this nature is comparatively simple to design and manufacture. It can be made in compact form and is economical in use and cost and is easy to manipulate and carry around. These features are of particular value for the kind of duty for which it is intended.

While but one general form of the invention is shown in the drawings and described in the specifications, it is not desired to limit this application for patent to this particular form it is appreciated that other forms of construction could be made that would use the same principles and come within the scope of the appended claims.

Having thus described the invention, what is claimed is:

1. A unitary device for forming magnetic impressions on a card having magnetizable material thereon and for subsequently sensing said impressions, said device comprising guiding means for the card, a plurality of alternating current sources of varying frequencies, a plurality of magnetic recording-reproducing heads positioned above and in proximity to the card, selective means when in one position for connecting said alternating current sources with said magnetic recording-reproducing heads to subject the card to magnetic impressions corresponding to said frequencies, means for longitudinally feeding the card beneath the said magnetic recording-reproducing heads while it is impressed, said selective means when in another position connecting the said magnetic recording-reproducing heads to a sensing electrical circuit for said card, said sensing electrical circuit comprising amplifiers, frequency selective filter units, and an indicating device, to cause operation of said indicating device by the subsequently sensed signals.

2. A unitary device as set forth in claim 1 wherein said magnetic recording-reproducing heads are adjustably movable crosswise over the card.

3. A unitary device as set forth in claim 1 wherein the means for longitudinally moving the card consist of a pair of spaced-drums, an endless belt over said drums and a variable-speed motor to rotate said drums.

References Cited in the file of this patent

UNITED STATES PATENTS

| | | |
|---|---|---|
| 2,224,646 | Friedman | Dec. 10, 1940 |
| 2,247,905 | Bryce | July 1, 1941 |
| 2,258,106 | Bryce | Oct. 7, 1941 |
| 2,275,609 | Bryce | Mar. 10, 1942 |
| 2,335,277 | Heller | Nov. 30, 1943 |
| 2,427,383 | Bryce | Sept. 16, 1947 |
| 2,530,029 | Pond | Nov. 14, 1950 |